US010621692B2

(12) United States Patent
Dong et al.

(10) Patent No.: US 10,621,692 B2
(45) Date of Patent: Apr. 14, 2020

(54) APPARATUS AND METHOD TO IMPROVE THE SCALABILITY OF GRAPHICS PROCESSOR UNIT (GPU) VIRTUALIZATION

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/576,841

(22) PCT Filed: Jun. 26, 2015

(86) PCT No.: PCT/CN2015/000462
§ 371 (c)(1),
(2) Date: Nov. 26, 2017

(87) PCT Pub. No.: WO2016/205975
PCT Pub. Date: Dec. 29, 2016

(65) Prior Publication Data
US 2018/0165791 A1 Jun. 14, 2018

(51) Int. Cl.
G06T 1/60 (2006.01)
G06F 12/0875 (2016.01)
(Continued)

(52) U.S. Cl.
CPC ............ *G06T 1/60* (2013.01); *G06F 9/45558* (2013.01); *G06F 9/4881* (2013.01);
(Continued)

(58) Field of Classification Search
CPC ....... G06F 12/1027; G06F 2009/45583; G06F 2212/152; G06F 2212/657; G06F 9/45533; G06F 9/45558; G06F 12/0215; G06T 1/60
See application file for complete search history.

(56) References Cited

U.S. PATENT DOCUMENTS

2005/0210158 A1\* 9/2005 Cowperthwaite ... G06F 9/45558
710/1
2006/0139360 A1 6/2006 Panesar et al.
(Continued)

FOREIGN PATENT DOCUMENTS

JP 103440612 A 12/2013
JP 104660711 A 5/2015

OTHER PUBLICATIONS

PCT Notification of Transmittal of the International Search Report and the Written Opinion of the International Searching Authority, or the Declaration from PCT/CN2015/000462, dated Apr. 1, 2016, 11 pages.

*Primary Examiner* — Hau H Nguyen
(74) *Attorney, Agent, or Firm* — Nicholson De Vos Webster & Elliott LLP

(57) ABSTRACT

An apparatus and method are described for performing virtualization using virtual machine (VM) sets. For example, one embodiment of an apparatus comprises: graphics processing unit (GPU) to process graphics commands and responsively render a plurality of image frames; a hypervisor to virtualize the GPU to share the GPU among a plurality of virtual machines (VMs); and VM set management logic to establish a plurality of VM sets, each set comprising a plurality of VMs, the VM set management logic to partition graphics memory address (GMADR) space across each of the VM sets but to share the GMADR space between VMs within each VM set.

30 Claims, 17 Drawing Sheets

(51) Int. Cl.
*G06F 9/455* (2018.01)
*G06F 9/48* (2006.01)
*G06F 12/1009* (2016.01)
*G06T 1/20* (2006.01)

(52) U.S. Cl.
CPC ...... *G06F 12/0875* (2013.01); *G06F 12/1009* (2013.01); *G06T 1/20* (2013.01); *G06F 2009/45579* (2013.01); *G06F 2009/45583* (2013.01); *G06F 2212/1048* (2013.01); *G06F 2212/152* (2013.01); *G06F 2212/302* (2013.01); *G06F 2212/657* (2013.01)

(56) References Cited

U.S. PATENT DOCUMENTS

| | | | |
|---|---|---|---|
| 2007/0008324 A1* | 1/2007 | Green | G06T 1/00 345/501 |
| 2013/0298124 A1* | 11/2013 | Vembu | G06F 9/4403 718/1 |
| 2015/0371355 A1* | 12/2015 | Chen | G06T 1/20 345/505 |

* cited by examiner

FIG. 9A GRAPHICS PROCESSOR COMMAND FORMAT
900
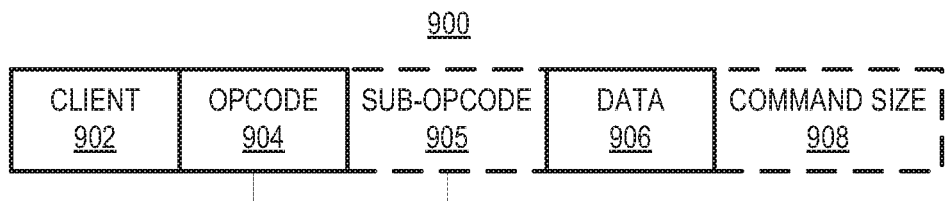
FIG. 9B GRAPHICS PROCESSOR COMMAND SEQUENCE
910
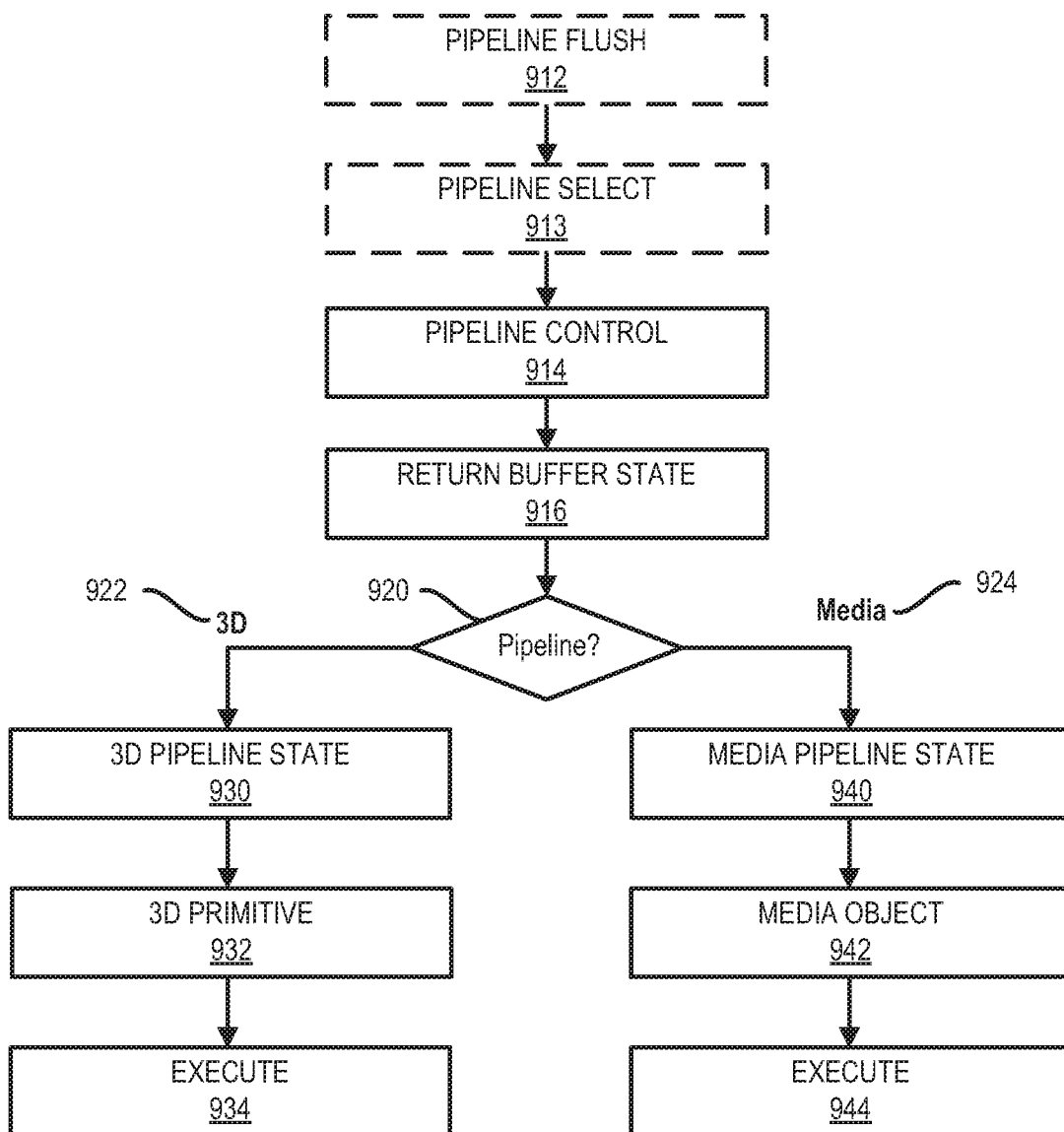

APPARATUS AND METHOD TO IMPROVE THE SCALABILITY OF GRAPHICS PROCESSOR UNIT (GPU) VIRTUALIZATION

CROSS-REFERENCE TO RELATED APPLICATION

This patent application is a U.S. National Phase Application under 35 U.S.C. § 371 of International Application No. PCT/CN2015/000462, filed Jun. 26, 2015, entitled APPARATUS AND METHOD TO IMPROVE THE SCALABILITY OF GRAPHICS PROCESSOR UNIT (GPU) VIRTUALIZATION.

BACKGROUND

Field of the Invention

This invention relates generally to the field of computer processors. More particularly, the invention relates to an apparatus and method to improve the scalability of graphics processor unit (GPU) virtualization.

DESCRIPTION OF THE RELATED ART

Static memory partitioning allows multiple virtual machines (VMs) to use portions of physical memory pages concurrently. Under static partitioning, the VMs can execute concurrently and access their memory in parallel because they use the different addresses. However static memory partitioning suffers from scalability issues, limiting the number of VMs which can take advantage of these techniques. In data centers, for example, powerful servers may be required to support tens or even hundreds of VMs concurrently. Basic static memory partitioning techniques are ineffective in such an implementation.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
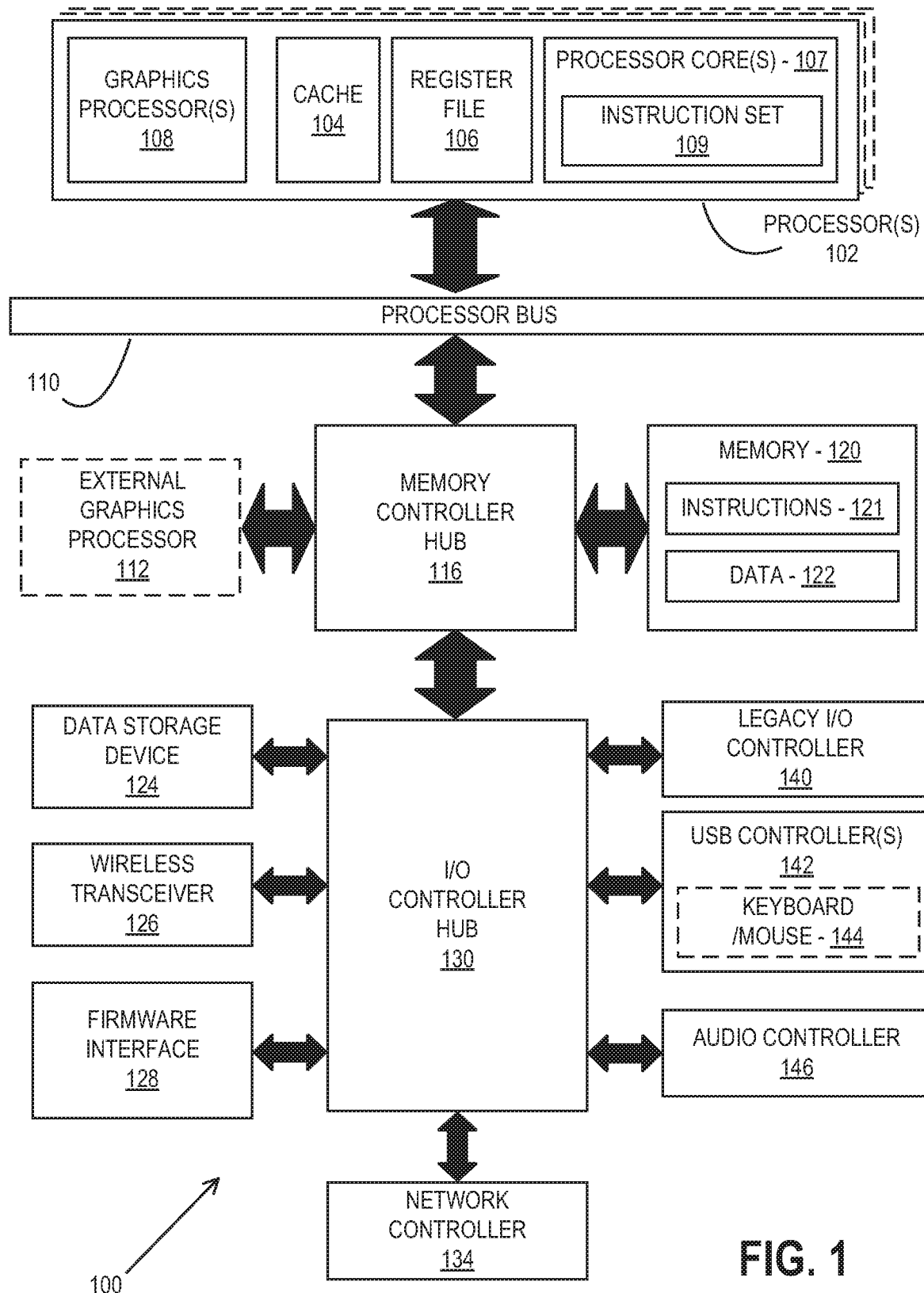
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC). Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments. ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
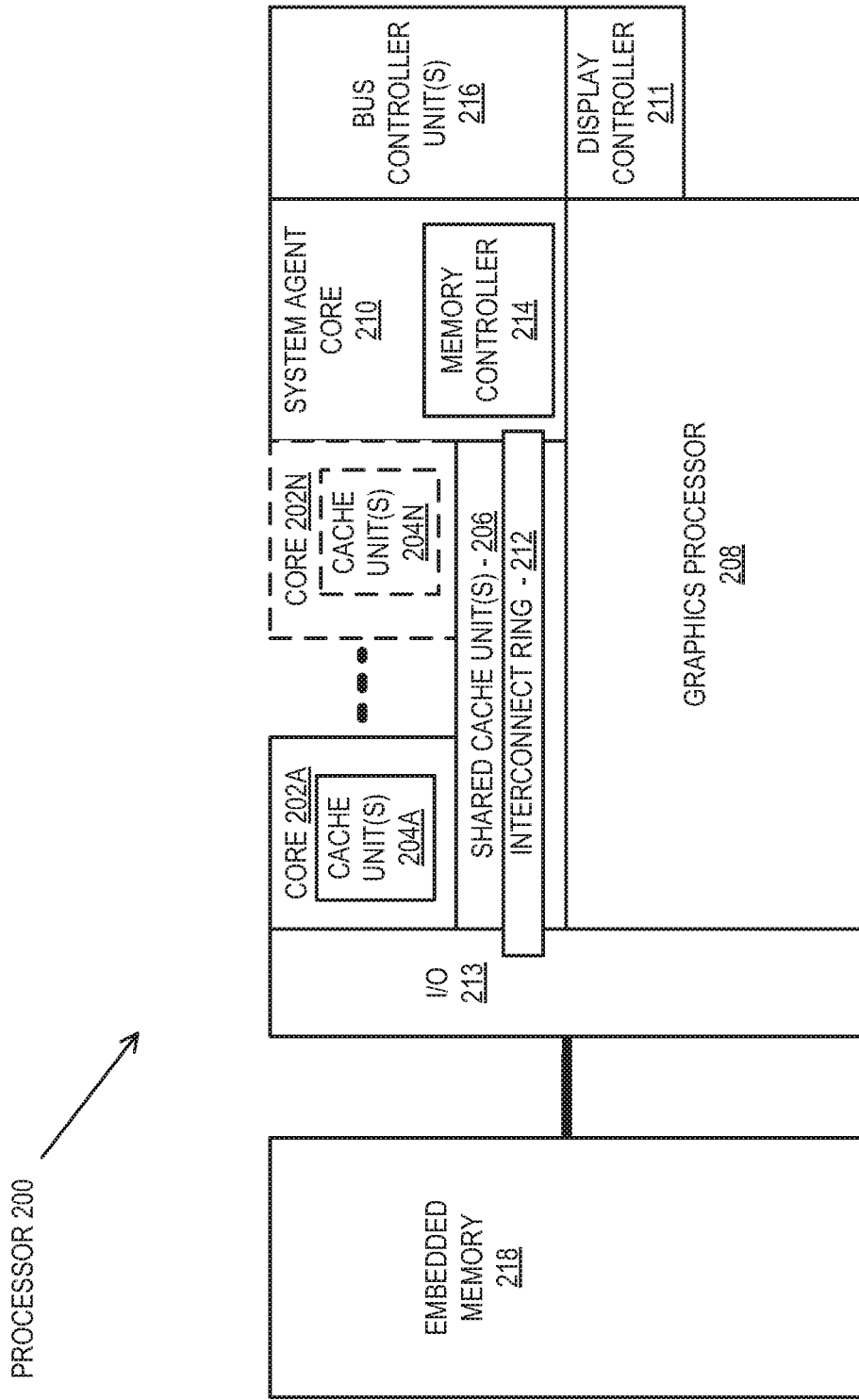
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3). Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
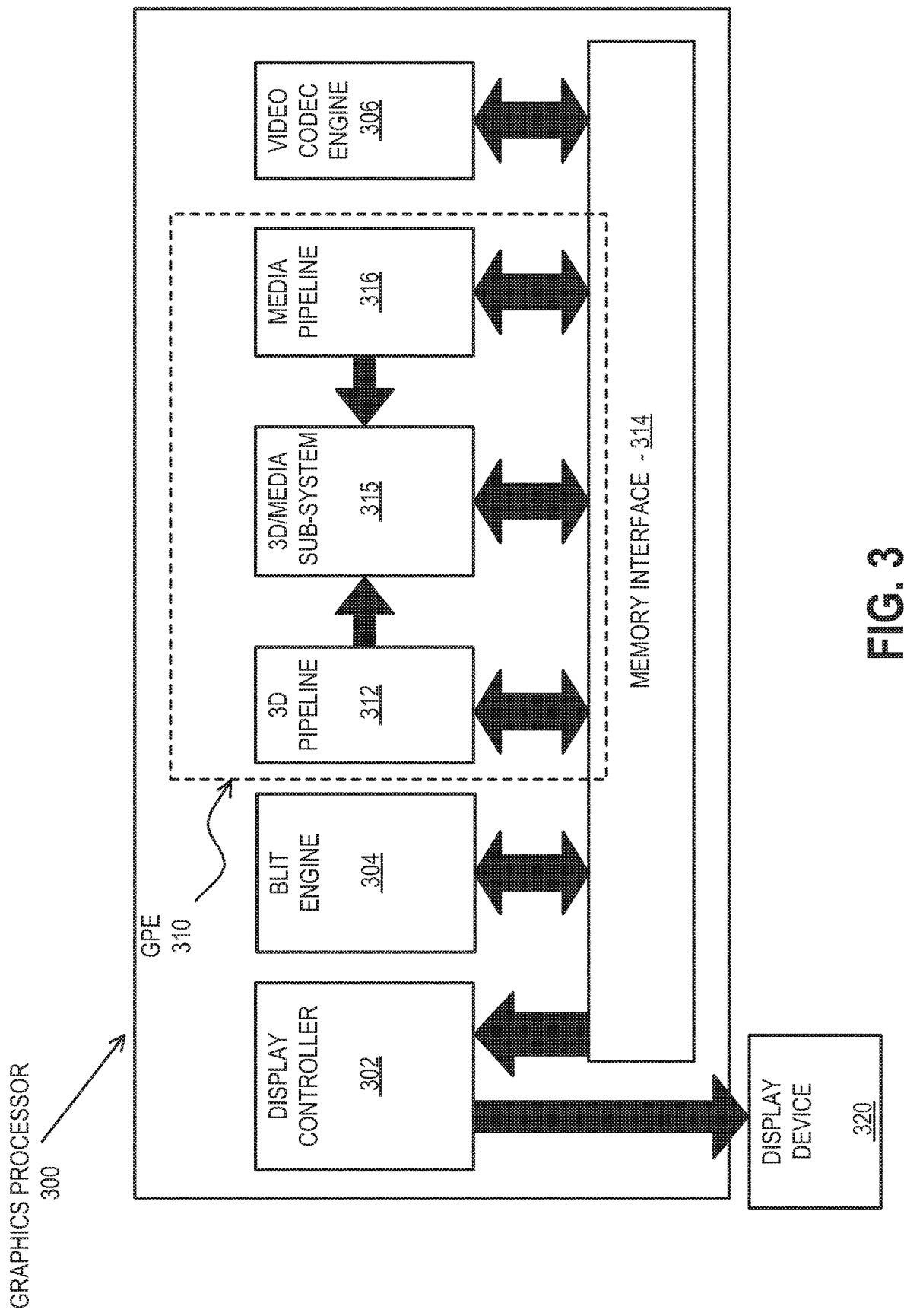
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
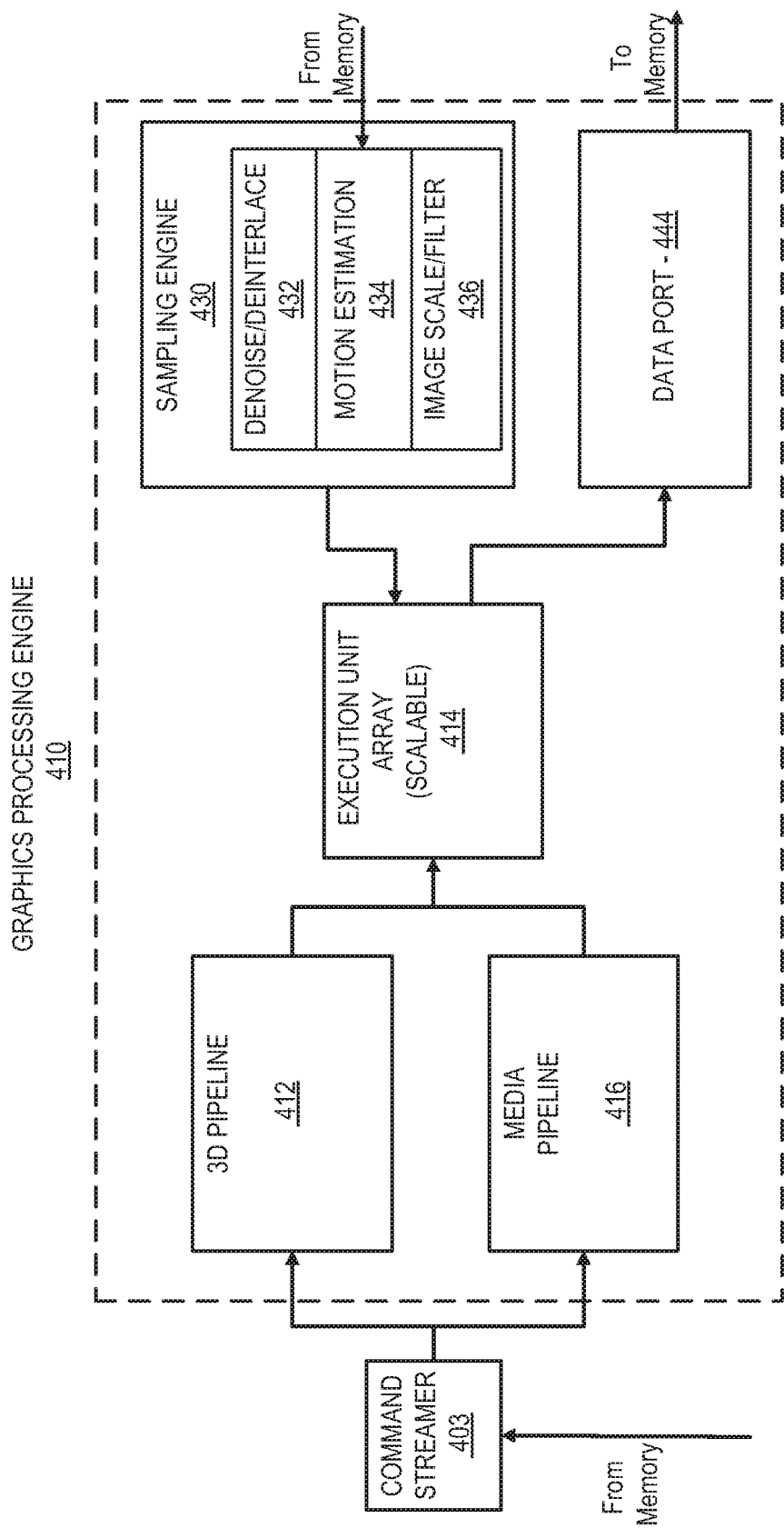
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
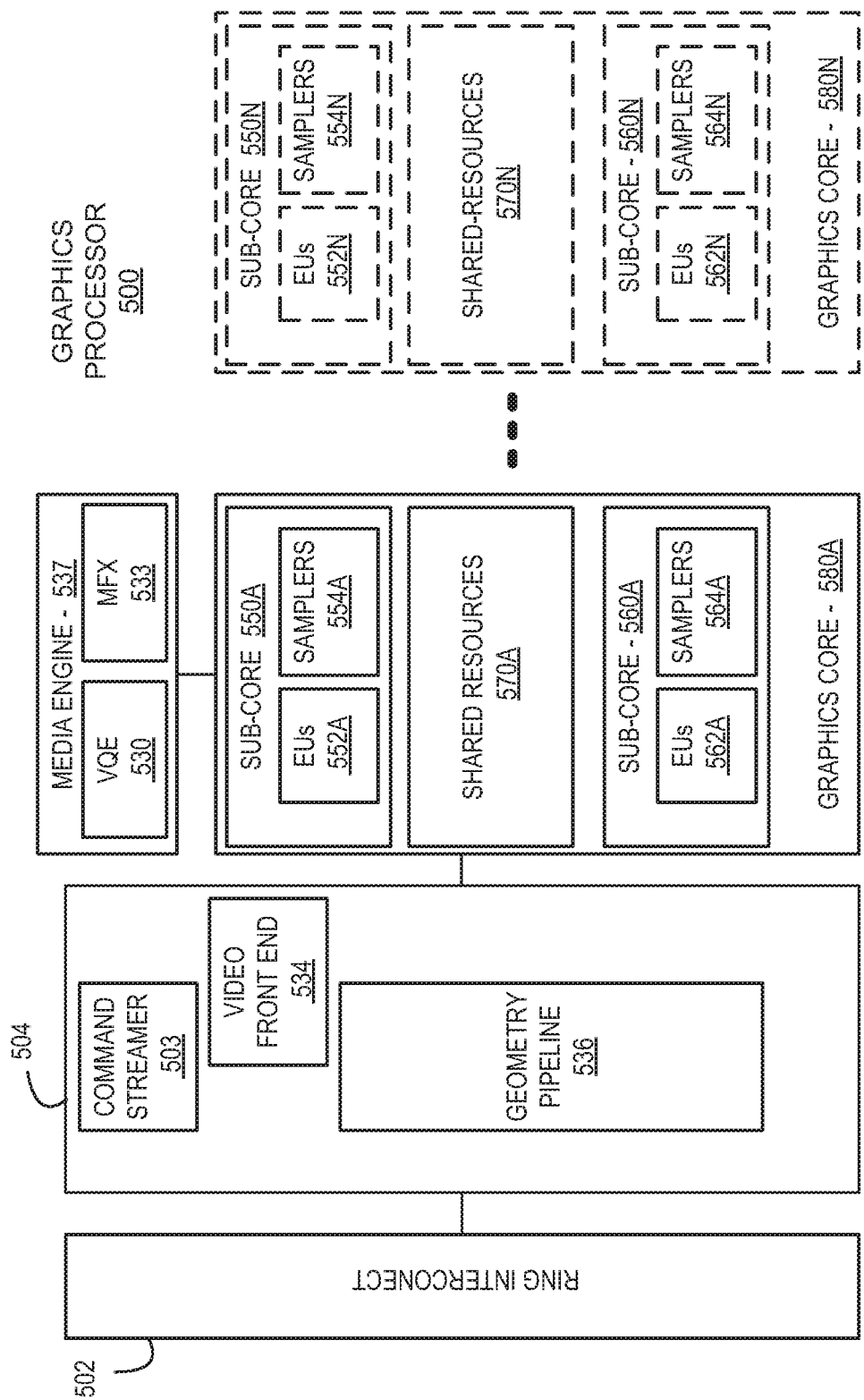
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N. 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
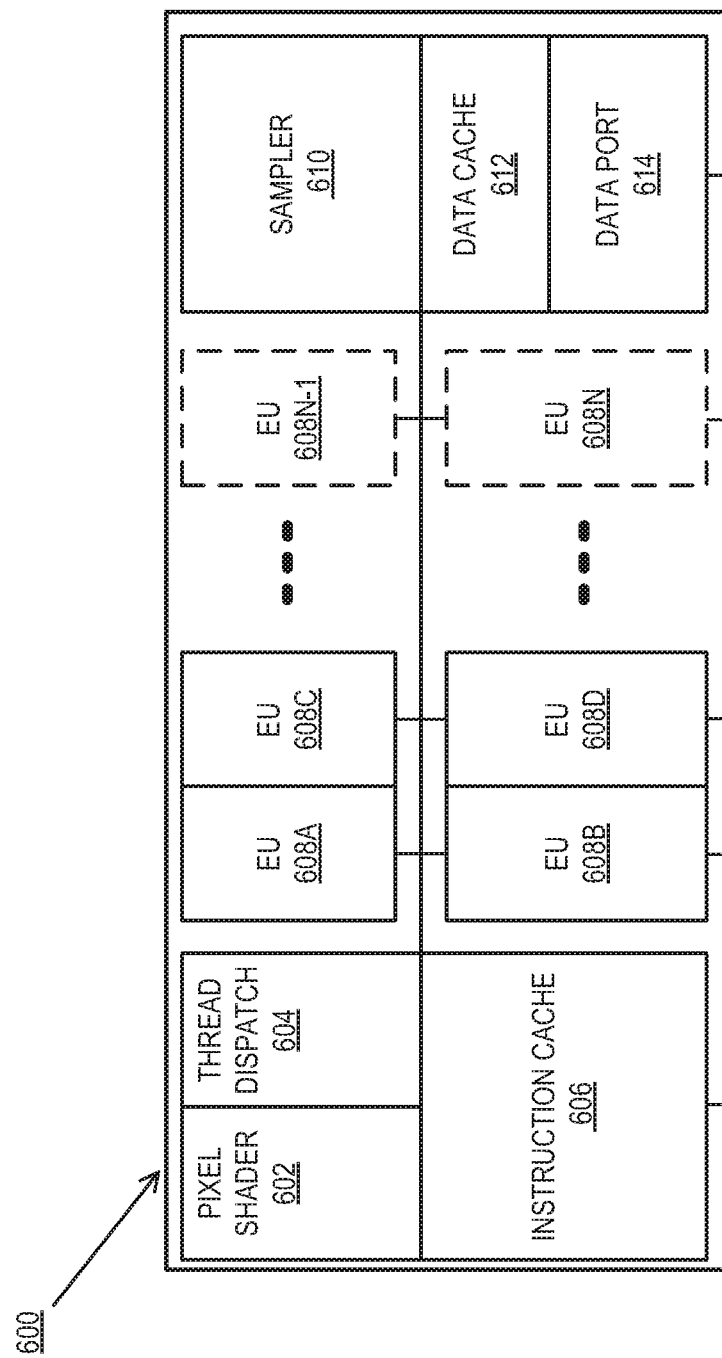
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
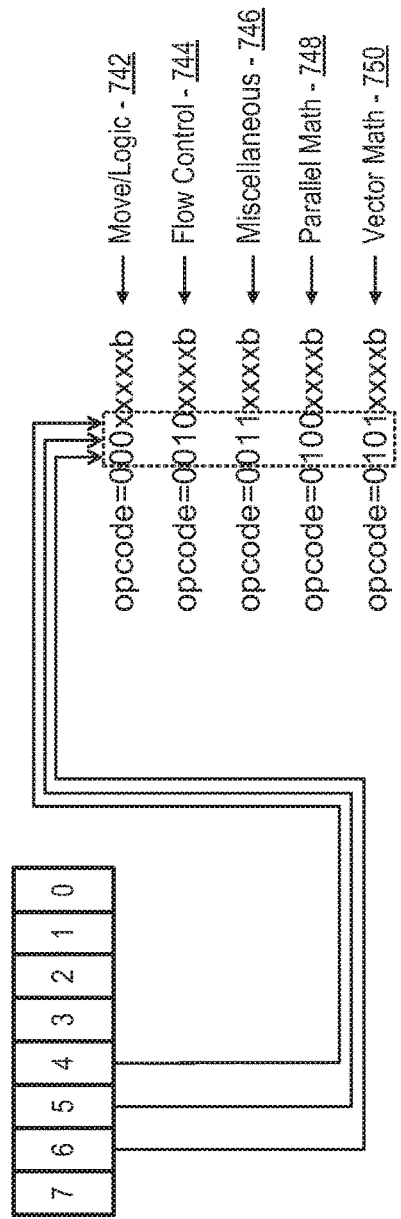
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
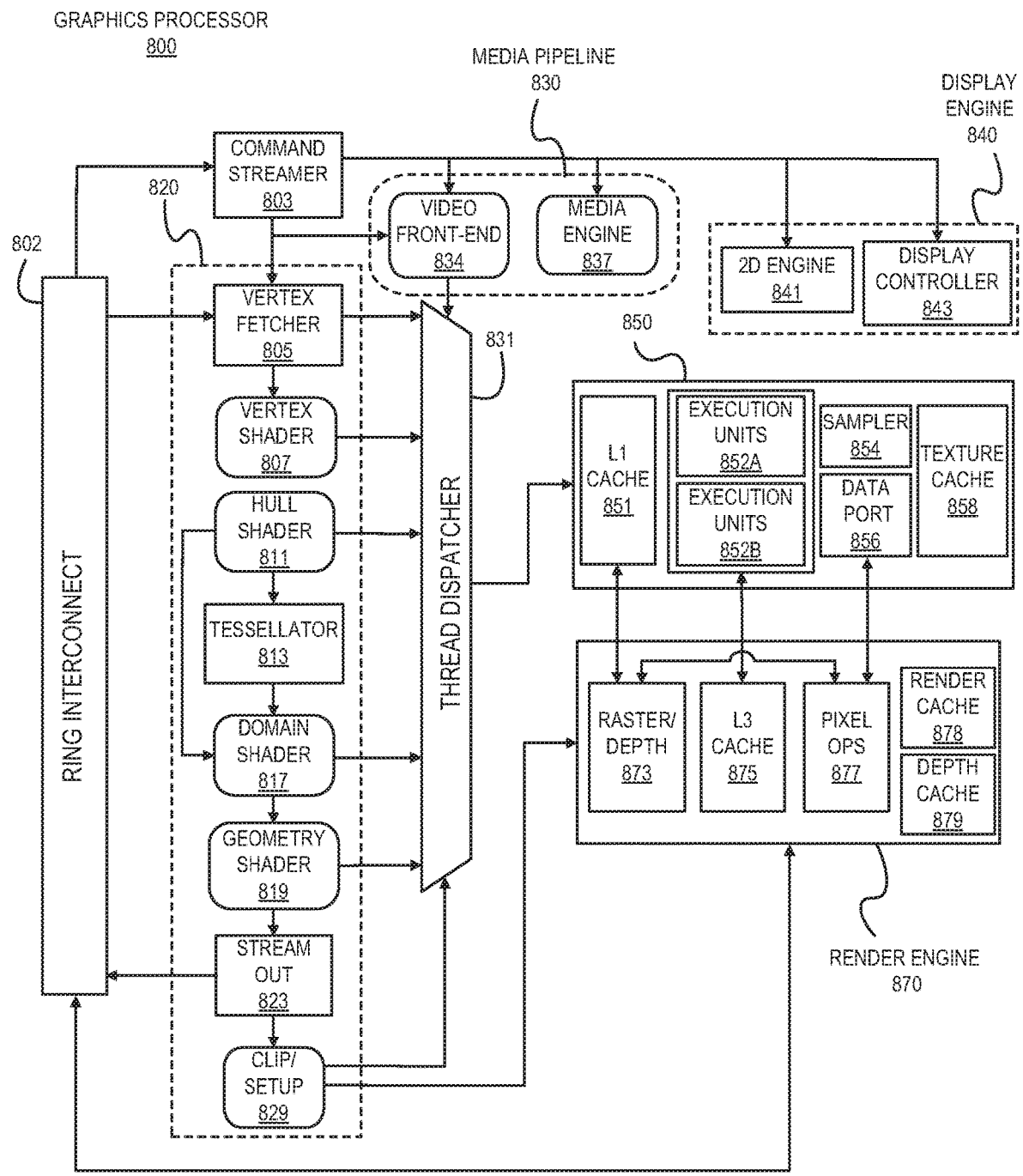
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments. GPGPU operations are configured and executed in a similar manner as media operations.

Graphics Software Architecture

Figure 10:
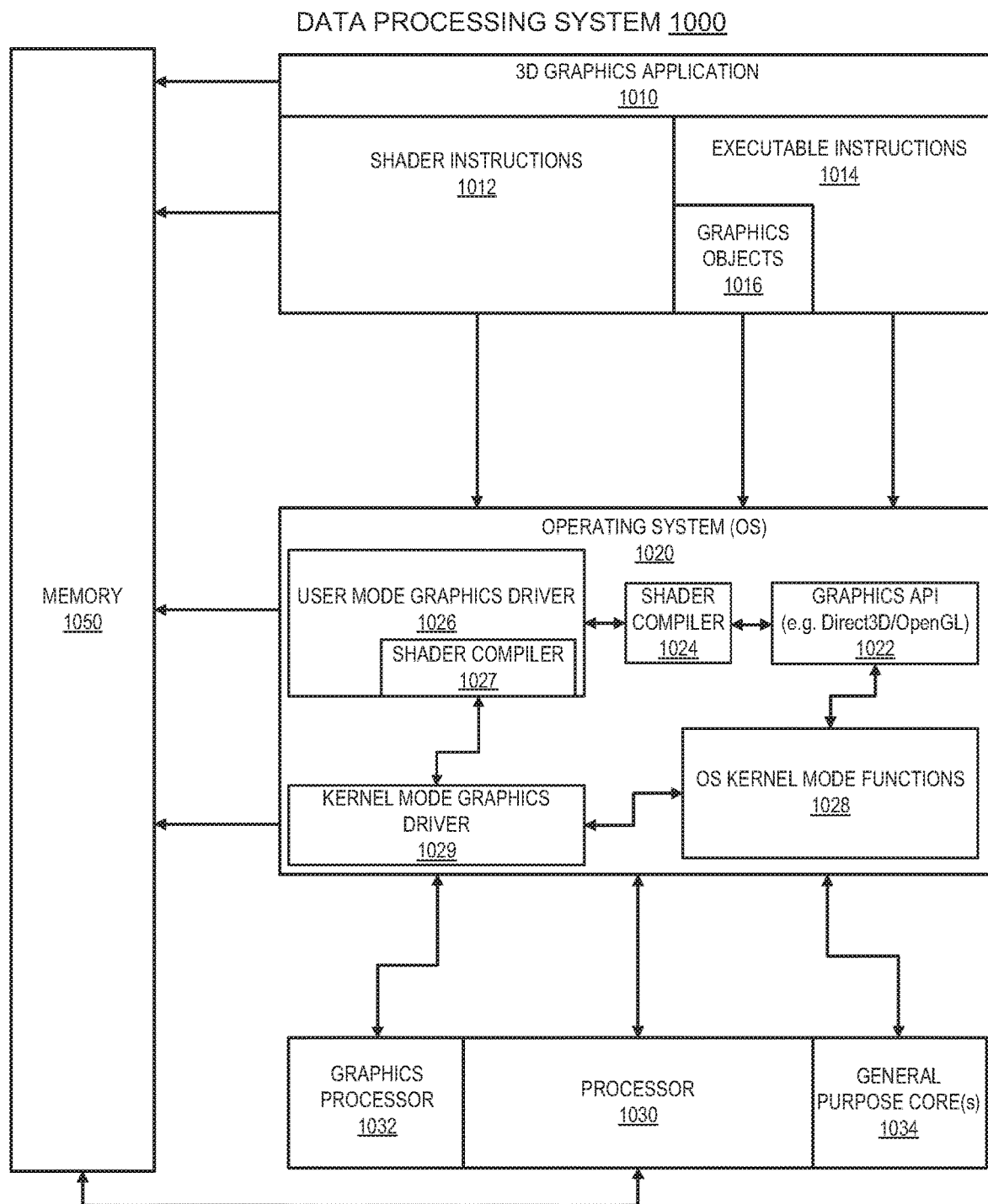
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
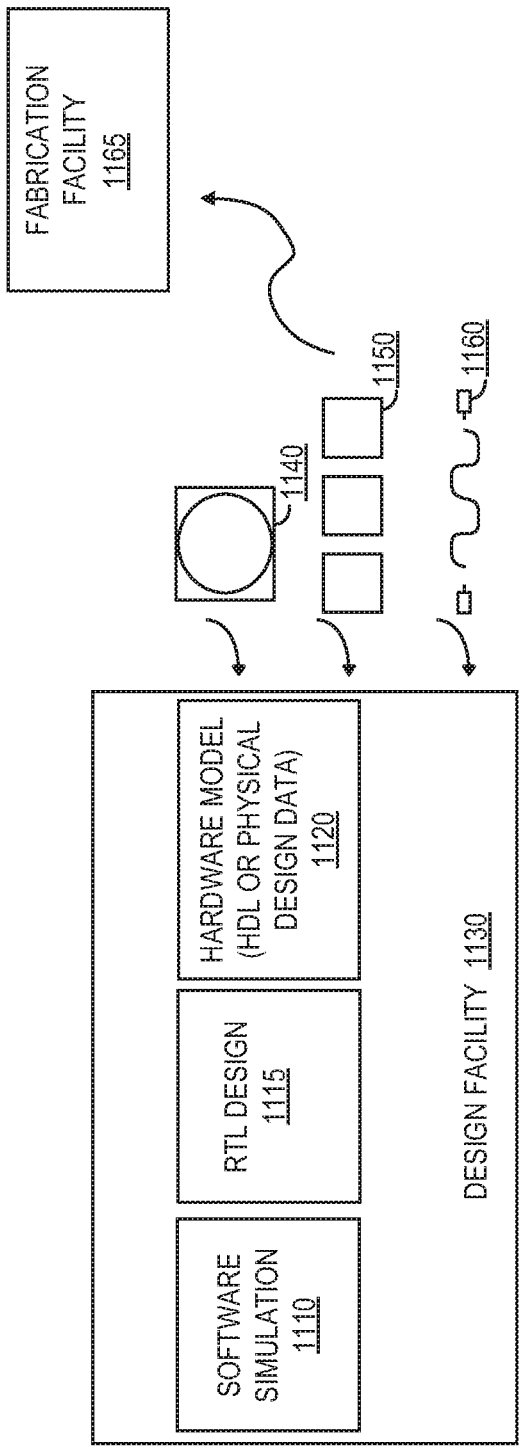
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
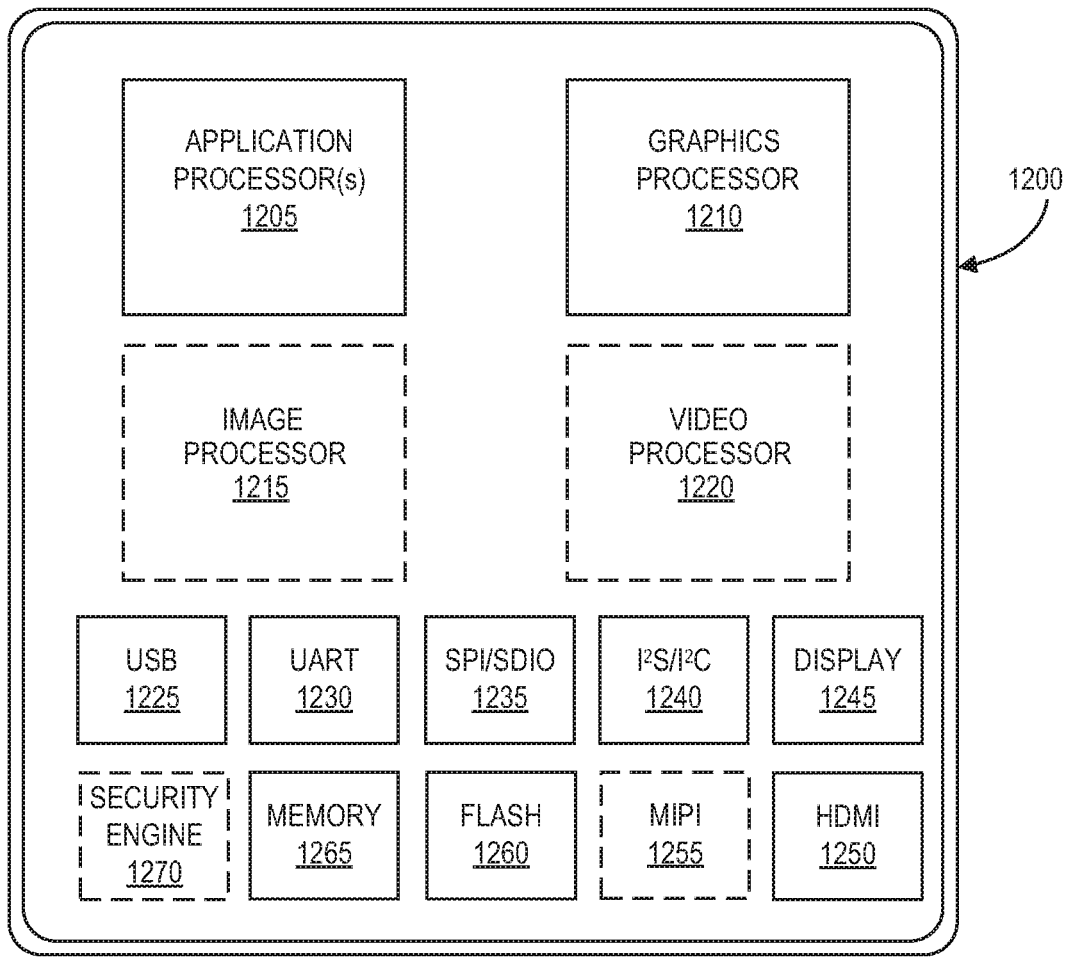
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Apparatus and Method to Improve the Scalability of Graphics Processor Unit (GPU) Virtualization As mentioned above, static memory partitioning allows multiple virtual machines (VMs) to use portions of physical memory pages concurrently. Under static partitioning, the VMs can execute concurrently and access their memory in parallel because they use the different addresses. However static memory partitioning suffers from scalability issues, limiting the number of VMs which can take advantage of these techniques. In data centers, for example, powerful servers may be required to support tens or even hundreds of VMs concurrently. Basic static memory partitioning techniques are ineffective in such an implementation.

Figure 13:
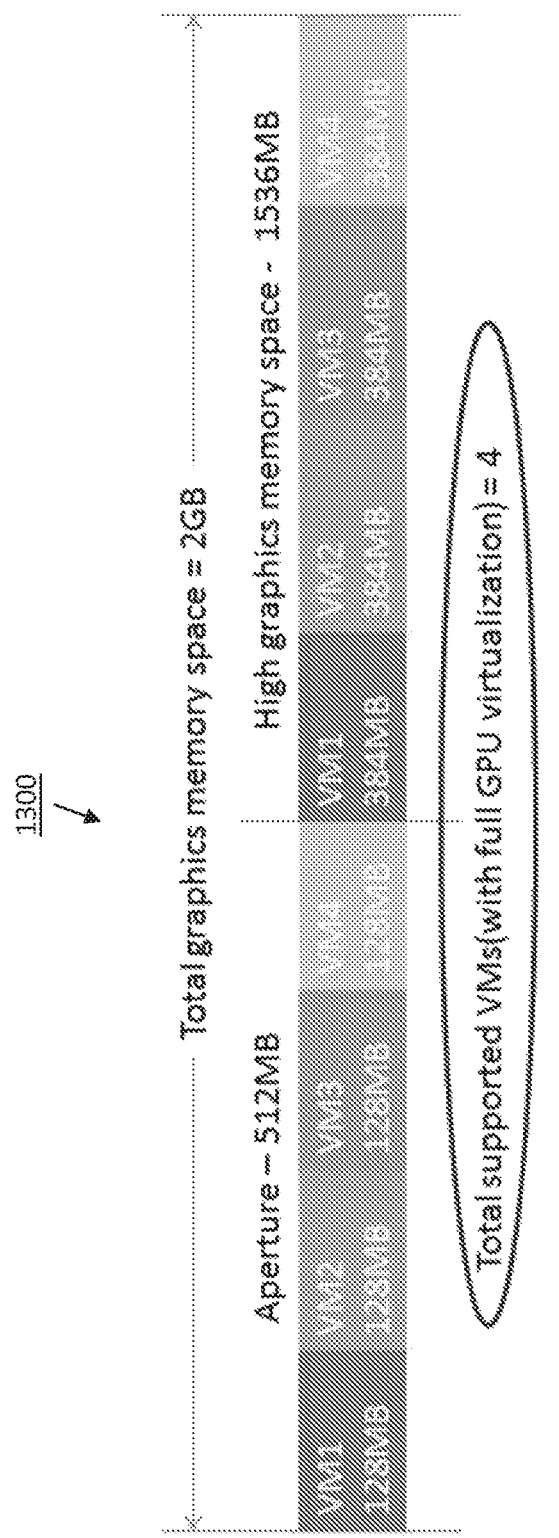
FIG. 13 illustrates an exemplary static global graphics memory space partitioning.

On the other hand, memory over-commitment technology is currently used to improve the utilization of physical memory pages to allow more virtual machines to run on a physical machine without the extra cost of upgrading the system memory. However, in the GPU virtualization area, the size of GPU graphics memory is limited, particularly for the global graphics memory which is subjected to a 2 GB limit due to the limitation of the Global Graphics Translation Table (GGTT). Because the GPU global graphics memory may be accessed by both CPUs and multiple GPU engines at same time, static partitioning technologies are used in today's GPU virtualization solutions. FIG. 13 illustrates the allocation 1300 of a 2 GB graphics memory space between four different VMs (VM1-VM4) which includes 512 MB allocated to the graphics aperture and 1536 MB allocated as high graphics memory space. Thus, each VM is individually allocated a 128 MB aperture space and 384 MB high graphics memory space. As a result, static partitioning of global graphics memory limits the number of VMs that are supported (e.g., 4 VMs for Windows guests and 8 VMs for Linux guests) due to the minimal size requirement in the guest OS GPU driver.

Global graphics memory partitioning (GGMP) may be acceptable for client usage but becomes a serious problem for server and datacenter usage where a powerful server may be required to support tens or potentially hundreds of VMs, such as for virtual desktop infrastructure (VDI) usage (i.e., a service that hosts user desktop environments on remote servers).

GGTT entry save/restore (GES) performed at the time of a VM switch, may also be used to address the problem. For example, some embodiments of the invention described herein improve performance by copying the portion of guest GGTT entries to physical GGTT when the VM is scheduled-in (e.g., overlapping the entries of the scheduled-out VM), to provide the map of current guest's global graphics memory (except the aperture which, in one embodiment, is still partitioned because of CPU utilization). The page frame number used in the guest GGTT entries may need to be converted into the physical page frame number when copying to the physical GGTT.

GES provides improved scalability but copying the GGTT entries during a VM switch takes time, and may result in a significant performance overhead. For example, one write of a GGTT entry may take ~100 cycles, and to copy the entire GGTT table (512 K entries) may takes 100*512 K=50 M cycles, which takes 800M cycles or ~40% of a 2 GHz core cycles, if the VM is scheduled in the frequency of 16 Hz.

Figure 14:
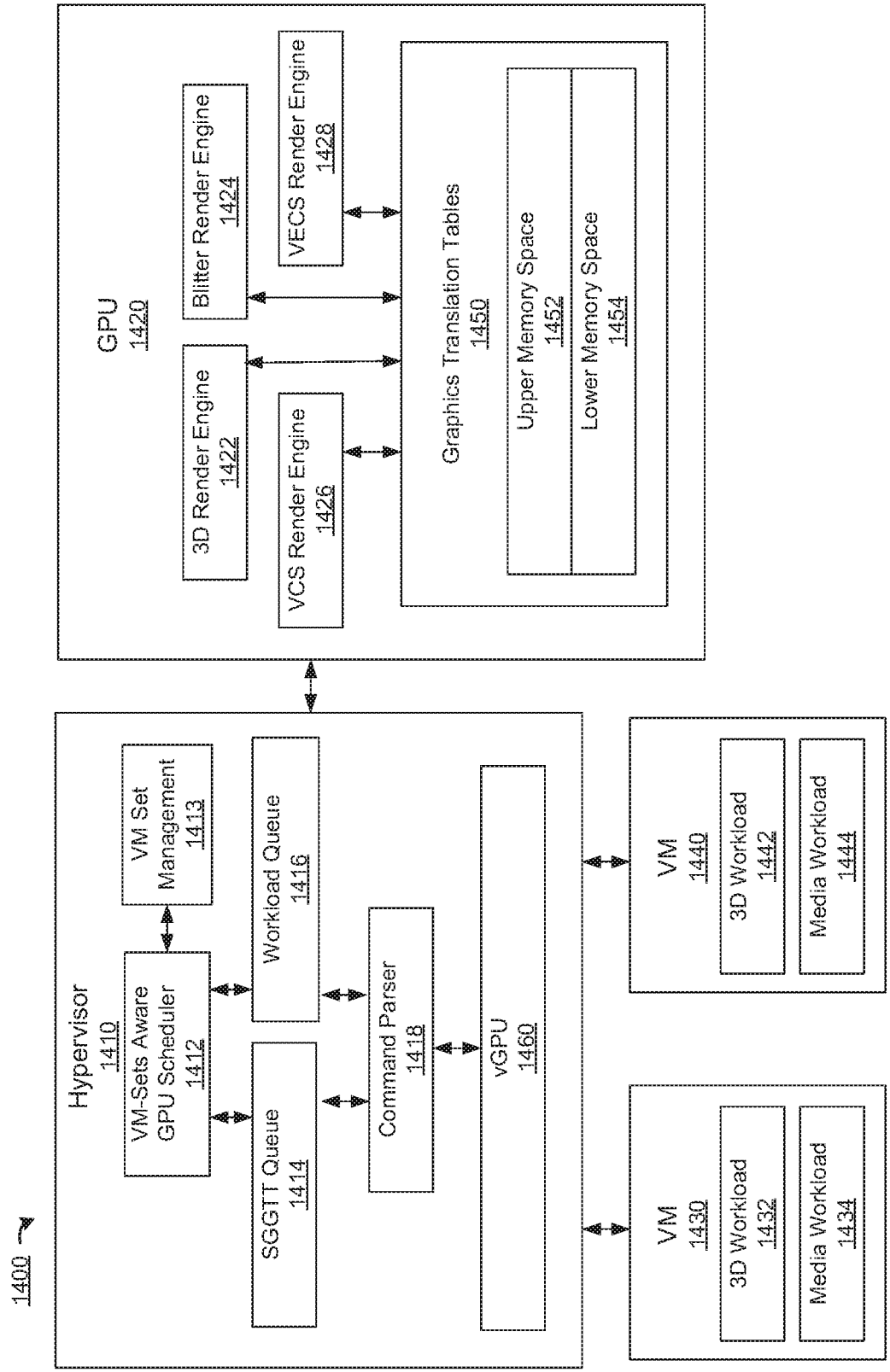
FIG. 14 illustrates one embodiment of a system architecture which includes virtual machine (VM) set management logic and a VM sets-aware GPU scheduler.

One embodiment of the invention provides for improved GPU VM scalability using a hybrid GMADR (graphics memory address) virtualization which combines the Global Graphics Memory Partitioning (GGMP) and GGTT entry save/restore (GES) mechanisms to achieve the best tradeoff between scalability and performance. In particular. FIG. 14 illustrates an architecture in accordance with one embodiment of the invention which includes VM set management logic 1413 which categories VMs into N different GPU VM sets (e.g., set_A, set_B, set_C and set_D), and partitions the GMADR space among different GPU VM sets, but shares the GMADR within each GPU VM set. For example, in one embodiment, the GGMP is partitioned among different sets to support 4 or 8 sets (as one example), but GES is used within a set to run 4 or 8 VMs per set, for a total of 16 to 64 VMs. In this manner, significantly more VMs may be run per GPU, which dramatically improves scalability while mitigating the overhead of the GGTT entry copy, because the size of the entries used within a GPU VM set is at most 1/X of the entire GGTT where X is set to a threshold value such as X=2, 4, 8, 16, etc (i.e., with the help of GGMP).

In addition, one embodiment includes a VM-sets aware GPU scheduler 1412 which performs scheduling in accordance with the defined GPU sets. For example, in a 4+ core system, using the configuration described herein, 4+ VMs may be executed concurrently, and the VM-sets aware GPU scheduler 1412 will try best to choose the VMs from different GPU VM sets (e.g., one VM from one GPU VM set), so that the physical (GGTT can hold all the translations for the 4+ selected VMs (because of partitioning). In some embodiments described below, the CPU (not shown) may also include a VM aware scheduler which implements similar scheduling techniques, assuming that the CPU may access the GMADR (i.e., the CPU visible part) such as the aperture.

Additional details of the apparatus 1400 shown in FIG. 14 will now be provided, outside of the context of VM sets, followed by a detailed description of operations performed by the VM set management logic 1413 and VM-sets aware GPU scheduler 1412 to improve scalability. One embodiment of the apparatus 1400 may include multiple VMs. e.g., VM 1430 and VM 1440, managed by hypervisor 1410, including access to a full array of GPU features in GPU 1420. A virtual GPU (vGPU), e.g., vGPU 1460, may access the full functionality provided by GPU hardware, e.g., GPU 1420 based on the GPU virtualization technology. In various embodiments, hypervisor 1410 may track, manage resources and lifecycles of one or more vGPUs. Although only vGPU 1460 is shown in FIG. 14, hypervisor 1410 may include other vGPUs. In some embodiments, vGPU 1460 may include virtual GPU devices presented to VMs 1430, 1440 and may be interactive with native GPU drivers. VM 1430 or VM 1440 may then access the full array of GPU features and use virtual GPU devices in vGPU 1460 to access virtual graphics processors. For instance, once VM 1430 is trapped into hypervisor 1410, hypervisor 1410 may manipulate a vGPU instance, e.g., vGPU 1460, and determine whether VM 1430 may access virtual GPU devices in vGPU 1460. The vGPU context may be switched per quantum or event. In some embodiments, the context switch may happen per GPU render engine, e.g., 3D render engine 1422 or blitter render engine 1424. The periodic switching allows multiple VMs to share a physical GPU in a manner that is transparent to the workloads of the VMs 1430, 1440.

GPU virtualization may take various forms. In some embodiments, VM 1430 may be enabled with device "pass-through." which is a virtualization model where the entire GPU 1420 is presented to VM 1430 as if they are directly connected. Much like a single central processing unit (CPU) core may be assigned for exclusive use by VM 1430, GPU 1420 may also be assigned for exclusive use by VM 1430 (e.g., for a limited time). Another virtualization model is timesharing, where GPU 1420 or portions of it may be shared by multiple VMs, e.g., VM 1430 and VM 1440, in a multiplexing fashion. Other GPU virtualization models may also be used by apparatus 1400 in other embodiments. In various embodiments, graphics memory associated with GPU 1420 may be partitioned, and allotted to various vGPUs in hypervisor 1410.

In various embodiments, graphics translation tables (GTTs) may be used by VMs and/or GPU 1420 to map graphics processor memory to system memory or to translate GPU virtual addresses to physical addresses. In some embodiments, hypervisor 1410 may manage graphics memory mapping via shadow GTTs, and the shadow GTTs may be held in a vGPU instance, e.g., vGPU 1460. In various embodiments, each VM may have a corresponding shadow GTT to hold the mapping between graphics memory addresses and physical memory addresses. In some embodiments, the shadow GTT may be shared and maintain the mappings for multiple VMs. In some embodiments, each VM (e.g., VM 1430 and VM 1440), may include both per-process and global GTTs.

In some embodiments, apparatus 1400 may use system memory as graphics memory. System memory may be mapped into multiple virtual address spaces by GPU page tables. Apparatus 1400 may support global graphics memory space and per-process graphics memory address space. The global graphics memory space may be a virtual address space, e.g., 2 GB, mapped through a global graphics translation table (GGTT). The lower portion of this address space may be referred to as the aperture, accessible by both the GPU 1420 and the CPU (not shown). The upper portion of this address space is called high graphics memory space or hidden graphics memory space, which may be used by GPU 1420 only. In various embodiments, shadow global graphics translation tables (SGGTTs) may be used by VM 1430, VM 1440, hypervisor 1410, or GPU 1420 for translating graphics memory addresses to respective system memory addresses based on a global memory address space.

In full GPU virtualization, a static global graphics memory space partitioning scheme may face a scalability problem. For example, as discussed above with respect to FIG. 13, for a global graphics memory space of 2 GB, the first 512 megabyte (MB) virtual address space may be reserved for aperture, and the remaining 1536 MB may become the high (hidden) graphics memory space. With the static global graphics memory space partitioning scheme, each VM with full GPU virtualization enabled may be allotted with 128 MB aperture and 384 MB high graphics memory space. Therefore, the 2 GB global graphics memory space may only accommodate a maximum of four VMs as previously discussed.

Besides the scalability problem, VMs with limited graphics memory space may also suffer performance degradation. Sometimes, severe performance downgrade may be observed in some media-heavy workloads of a media application when it uses GPU media hardware acceleration extensively. As an example, to decode one channel 1080p H.264/Advanced Video Coding (AVC) bit stream, at least 40 MB of graphics memory may be needed. Thus, for 10 channels of 1080p H264/AVC bit stream decoding, at least 400 MB of graphics memory space may be needed. Meanwhile, some graphic memory space may have to be set aside for surface composition/color conversion, switching display frame buffer during the decoding process, etc. In this case, 512 MB of graphics memory space per VM may be insufficient for a VM to run multiple video encoding or decoding.

In some embodiments, apparatus 1400 may achieve GPU graphics memory overcommitment with on-demand SGGTTs. In some embodiments, hypervisor 1410 may construct SGGTTs on demand, which may include all the to-be-used translations for graphics memory virtual addresses from different GPU components' owner VMs. In some embodiments, at least one VM managed by hypervisor 1410 may be allotted with more than static partitioned global graphics memory address space as well as memory. In some embodiments, at least one VM managed by hypervisor 1410 may be allotted with or able to access the entire high graphics memory address space. In some embodiments, at least one VM managed by hypervisor 1410 may be allotted with or able to access the entire graphics memory address space.

Hypervisor 1410 may use command parser 1418 to detect the potential memory working set of a GPU rendering engine for the commands submitted by VM 1430 or VM 1440. In various embodiments, VM 1430 may have respective command buffers (not shown) to hold commands from 3D workload 1432 or media workload 1434. Similarly. VM 1440 may have respective command buffers (not shown) to hold commands from 3D workload 1442 or media workload 1444. In other embodiments, VM 1430 or VM 1440 may have other types of graphics workloads.

In various embodiments, command parser 1418 may scan a command from a VM and determine if the command contains memory operands. If yes, the command parser may read the related graphics memory space mappings, e.g., from a GTT for the VM, and then write it into a workload specific portion of the SGGTT. After the whole command buffer of a workload gets scanned, the SGGTT that holds memory address space mappings associated with this workload may be generated or updated. Additionally, by scanning the to-be-executed commands from VM 1430 or VM 1440, command parser 1418 may also improve the security of GPU operations, such as by mitigating malicious operations.

In some embodiments, one SGGTT may be generated to hold translations for all workloads from all VMs. In some embodiments, one SGGTT may be generated to hold translations for all workloads. e.g., from one VM only. The workload specific SGGTT portion may be constructed on demand by command parser 1418 to hold the translations for a specific workload, e.g., 3D workload 1432 from VM 1430 or media workload 1444 from VM 1440.

In some embodiments, the VM-sets aware GPU scheduler 1412 may construct such on-demand SGGTT at the time of execution. A specific hardware engine may only use a small portion of the graphics memory address space allocated to VM 1430 at the time of execution, and the GPU context switch happens infrequently. To take advantage of such GPU features, hypervisor 1410 may use the SGGTT for VM 1430 to only hold the in-execution and to-be-executed translations for various GPU components rather than the entire portion of the global graphics memory address space allotted to VM 1430.

The VM-sets aware GPU scheduler 1412 may be separated from the scheduler for CPU in apparatus 1400. To take the advantage of the hardware parallelism in some embodiments, GPU scheduler 1412 may schedule the workloads separately for different GPU engines, e.g., 3D render engine 1422, blitter render engine 1424, video command streamer (VCS) render engine 1426, and video enhanced command streamer (VECS) render engine 1428. For example, VM 1430 may be 3D intensive, and 3D workload 1432 may need to be scheduled to 3D render engine 1422 at a moment. Meanwhile. VM 1440 may be media-intensive, and media workload 1444 may need to be scheduled to VCS render engine 1426 and/or VECS render engine 1428. In this case, GPU scheduler 1412 may schedule 3D workload 1432 from VM 1430 and media workload 1444 from VM 1440 separately.

In various embodiments, GPU scheduler 1412 may track in-executing SGGTTs used by respective render engines in GPU 1420. In this case, hypervisor 1410 may retain a per-render engine SGGTT for tracking all executing graphic memory working sets in respective render engines. In some embodiments, hypervisor 1410 may retain a single SGGTT for tracking all in-executing graphic memory working sets for all render engines. In some embodiments, such tracking may be based on a separate in-executing SGGTT queue (not shown). In some embodiments, such tracking may be based on markings on SGGTT queue 1414. e.g., using a registry. In some embodiments, such tracking may be based on markings on workload queue 1416, e.g., using a registry.

During the scheduling process, the VM-sets aware GPU scheduler 1412 may examine the SGGTT from SGGTT queue 1414 for a to-be-scheduled workload from workload queue 1416. In some embodiments, to schedule the next VM for a particular render engine, GPU scheduler 1412 may check whether the graphic memory working sets of the particular workload used by the VM for that render engine conflict with the in-executing or to-be-executed graphic memory working sets by that render engine. In other embodiments, such conflict checks may extend to check with the in-executing or to-be-executed graphic memory working sets by all other render engines. In various embodiments, such conflict checks may be based on the corresponding SGGTTs in SGGTT queue 1414 or based on SGGTTs retained by hypervisor 1410 for tracking all in-executing graphic memory working sets in respective render engines as discussed hereinbefore.

If there is no conflict, VM-sets aware GPU scheduler 1412 may integrate the in-executing and to-be-executed graphic memory working sets together. In some embodiments, a resulting SGGTT for the in-executing and to-be-executed graphic memory working sets for the particular render engine may also be generated and stored, e.g., in SGGTT queue 1414 or in other data storage means. In some embodiments, a resulting SGGTT for the in-executing and to-be-executed graphic memory working sets for all render engines associated with one VM may also be generated and stored if the graphics memory addresses of all these workloads do not conflict with each other.

Before submitting a selected VM workload to GPU 1420, hypervisor 1410 may write corresponding SGGTT pages into GPU 1420, e.g., to graphics translation tables 1450. Thus, hypervisor 1410 may enable this workload to be executed with correct mappings in the global graphics memory space. In various embodiments, all such translation entries may be written into graphics translation tables 1450. Graphics translation tables 1450 may contain separate tables per VM to hold for these translation entries in some embodiments. Graphics translation tables 1450 may also contain separate tables per render engine to hold for these translation entries in other embodiments. In various embodiments, graphics translation tables 1450 may contain, at least, to-be-executed graphics memory addresses.

In some of the embodiments described below, a different policy is implemented for the lower memory space (aperture) 1454 and the upper memory space 1452. Certain embodiments, for example, only focus on the upper memory space (used by the GPU only). The lower memory space 1454 is more problematic because CPU may access it as well. Thus, in some embodiments, the techniques described herein are applied to the upper memory space only while a static partitioning policy is used for the lower memory space. In other embodiments, however, a scheduler is used to schedule the CPU within the lower memory space in a similar manner to the various GPU engines (see, e.g., Section C.4, below entitled "*Co-existence of GPU VM sets-aware GPU scheduler and CPU scheduler*"). Unless otherwise stated, the techniques described below are limited to the upper memory space.

In one embodiment, if there is a conflict determined by VM-sets aware GPU scheduler 1412, it may then defer the schedule-in of that VM, and try to schedule-in another workload of the same or a different VM instead. In some embodiments, such conflict may be detected if two or more VMs may attempt to use a same graphics memory address. e.g., for a same render engine or two different render engines. In some embodiments, GPU scheduler 1412 may change the scheduler policy to avoid selecting one or more of the rendering engines, which have the potential to conflict with each other. In some embodiments, VM-sets aware GPU scheduler 1412 may postpone the schedule-in of the conflicting VM to mitigate the conflict.

In some embodiments, the memory overcommitment scheme in GPU virtualization as discussed herein may co-exist with static global graphics memory space partitioning schemes and with the VM sets processing techniques described below. As an example, the aperture in lower memory space 1454 may still be used for static partition among all VMs and the high graphics memory space in upper memory space 1452 may be used for the memory overcommitment scheme. Compared to the static global graphics memory space partitioning scheme, memory overcommit scheme in GPU virtualization may enable each VM to use the entire high graphics memory space in upper memory space 1452, which may allow some applications inside each VM to use greater graphic memory space for improved performance.

A. GMADR Virtualization and Map

Figure 15:
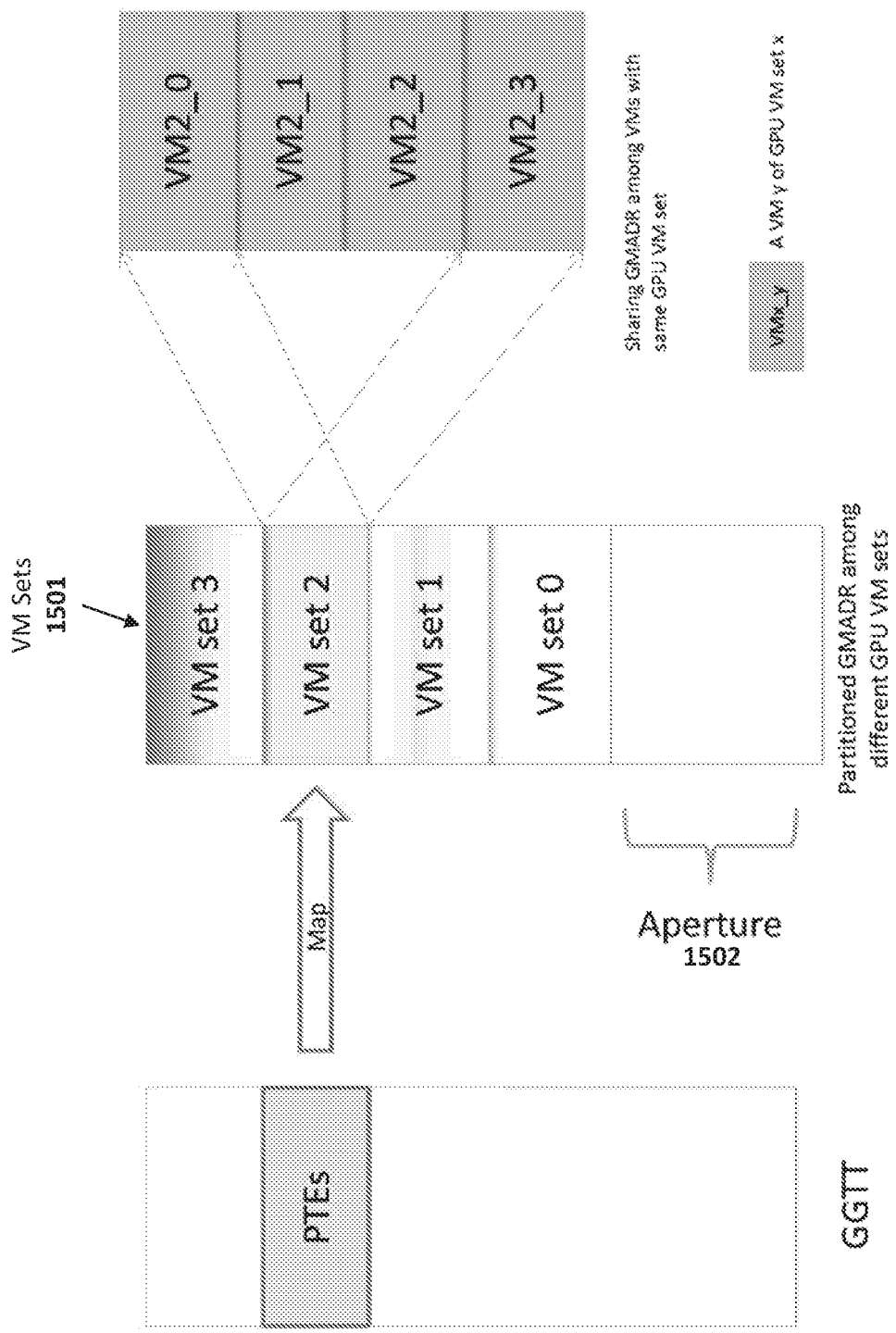
FIG. 15 illustrates graphics memory address (GMADR) partitioning using VM sets in accordance with one embodiment of the invention.

As mentioned above, in one embodiment, VM sets management logic 1413 categories VMs into different GPU VM sets (e.g., set_A, set_B, set_C and set_D), and partitions the GMADR high memory address space among different GPU VM sets, but shares the GMADR (e.g., the CPU-invisible portion of the address space) within each GPU VM set. As mentioned, for the lower GM address space (aperture), static partitioning of the low address space is performed among all VMs. FIG. 15 illustrates a hybrid GMADR virtualization employed in one embodiment, which combines the Global Graphics Memory Partitioning (GGMP) and GGTT entry/switch (GES) techniques to achieve the best tradeoff of scalability and performance. In the illustrated hybrid GMADR implementation, the physical GMADR are partitioned among GPU VM sets 1501 for higher end GMADR (i.e., accessible to GPU). The specific example in FIG. 15 utilizes four GPU VM sets: VM set 0, VM set 1, VM set 2, and VM set 3, which partition the GMADR high space. In one embodiment, multiple VMs dynamically share the high GMADR space of each GPU VM set. In FIG. 15, for example, VM Set 2 is shared by VM2_0 through VM2_3. Thus, in this example, for each VM2_*x*, the GMADDR high address space is limited to the scope of GPU VM set 2, in one embodiment, the GMADR space used by other GPU VM sets are all presented as reserved in VM2_*x*.

Note that in the illustrated example, only higher end GMADR are shown. The details of the aperture 1502 (i.e., the lower end) are not shown but, in one embodiment, static partitioning is applied to the aperture.

As used herein, the term "GPU VM" means the VM using the GPU resources with mediate passthrough. It may not necessarily include the VMs that use emulated graphics devices such as a standard VGA card and/or framebuffer devices, for example.

B. GMADR Dynamic Switch

Figure 16:
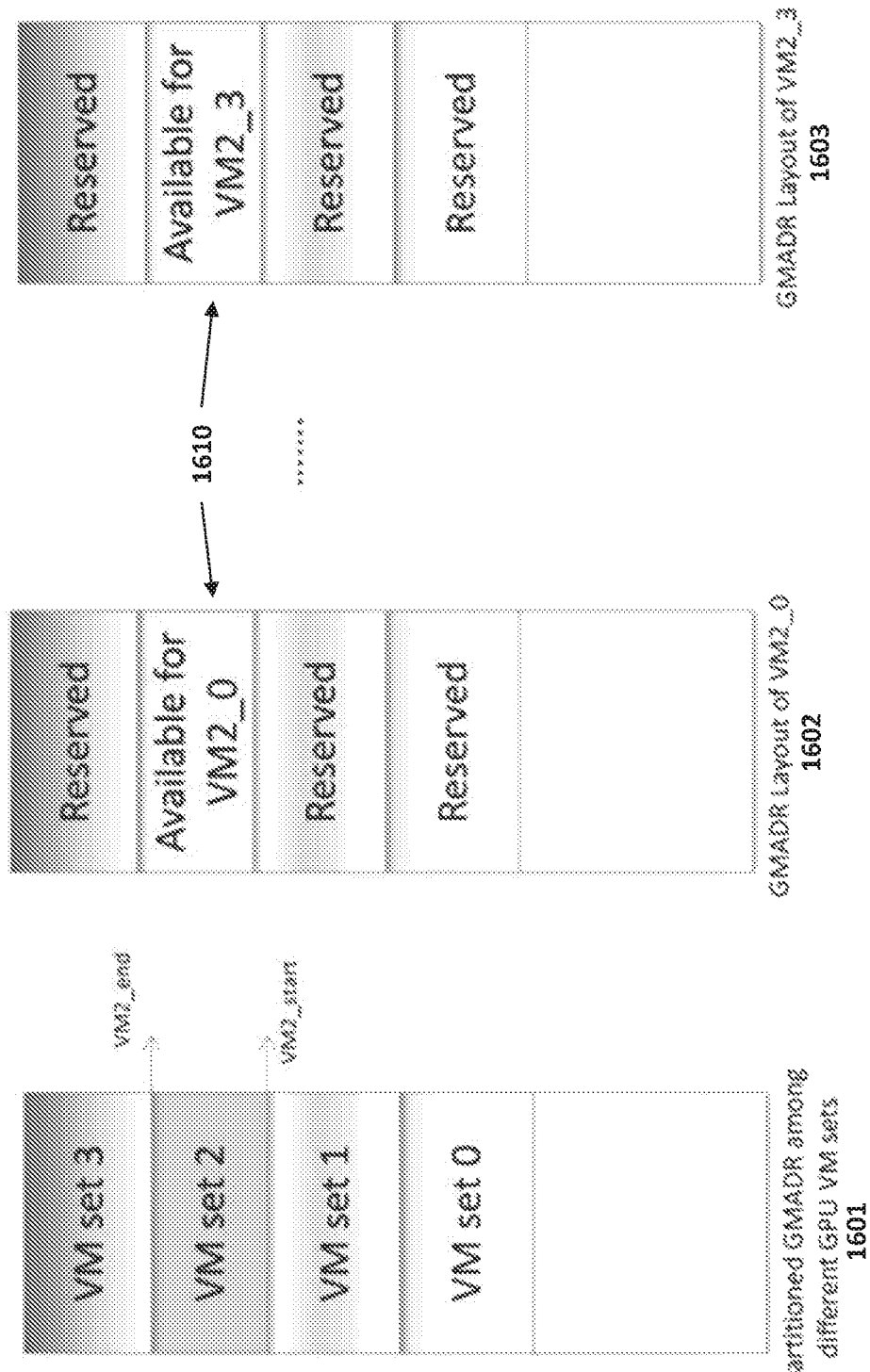
FIG. 16 illustrates an exemplary GMADR layout for a particular VM in accordance with one embodiment of the invention.

In one embodiment, when different VMs of a GPU VM set are scheduled in, the GGTT entries of the new VM may be copied to the physical GGTT in place of the old GGTT entries of the original VM. For example, FIG. 16 illustrates an exemplary GMADR 1601 partitioned among four different GPU VM sets (0-3) and also shows the GMADR layout 1601 when VM2_0 has been scheduled (i.e., using available GMADR space 1610) and when VM2_3 has been scheduled (i.e., using the same GMADR space 1610 for VM2_3).

For example, if the previously executed VM is VM2_1 (the GGTT entry of VM2_1 resides in the physical GGTT), and the next VM is VM2_0, the next VM's GGTT entries may be copied to the physical GGTT in accordance with the following pseudo code:

A: prev = VM2_1, next = VM2_0

B: p_ggtt_pte = the first partitioned address of GPU VM set 2 (vm2_start) in physical GGTT (shown in Figure 16), and v_ggtt_pte = the first partitioned address in guest GGTT. Note that the hypervisor may maintain both the physical GGTT instance and the guest GGTT instance.

```
C: while (p_ggtt_pte < vm2_end) {
    X = *v_ggtt_pte++;
    Y = map X to the shadow PTE with corresponding conversion to generate the
    shadow or physical instance (for example, the guest page number needs to be converted
    to host page number, and/or other attributes per guest PTE/shadow PTE virtualization
    policy).
    *p_ggtt_pte++ = Y;
};
```

This way, the overhead of GGTT entry copy is reduced to be ¼ of that using the GES solution alone, and therefore improves the performance. In addition, at most 4 VMs can be run concurrently which is impossible using GES.

C. GPU VM Sets-Aware Scheduler 1412

In one embodiment, the GPU 1420 has multiple execution engines, such as 3D rendering engine 1422, blitter render engine 1424, VCS rendering engine 1426, and VECS render engine 1428. Each engine may execute an instance of a guest GPU (e.g., in a per-ring scheduler). This works well with GMADR space partitioning but may result in problems with GES and the approach described herein where the GGTT maps of two or more VMs' GMADR may conflict, such as VM2_0 & VM2_1 in the example provided above.

Figure 17A:
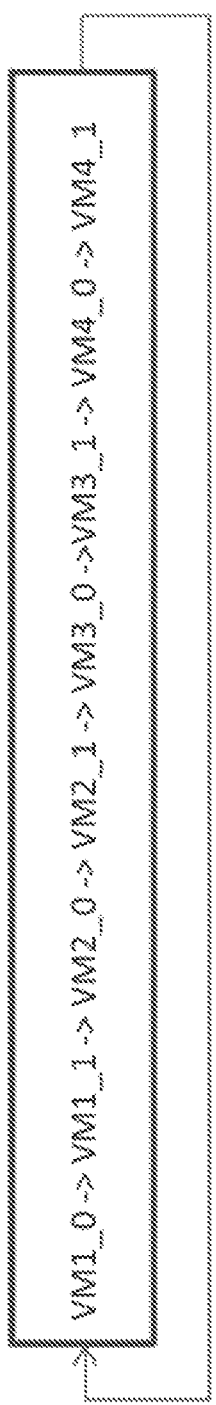
FIGS. 17A-B illustrate VM scheduling in accordance with one embodiment of the invention.

By way of a specific example, FIG. 17A illustrates scheduling in which VM1_0 is followed by VM1_, resulting in GGTT entry copying for the shared GMADR space. Similarly, VM2_0 is followed by VM2_1, VM3_0 is followed by VM3_1, and VM4_0 is followed by VM4_1, requiring additional GGTT entry copying for each of these shared GMADR spaces. Thus, scheduling the same set of VMs sequentially, as shown in FIG. 17A, may cause frequent GGTT entry copying, which incurs a lot of virtualization overhead and therefore suboptimal performance.

1. GPU VM Sets-Aware Scheduler with Sufficient Rendering Engines

In this embodiment, the number of GPU hardware engines is larger than the number of GPU VM sets (engine #>VM set #). In other words, the GPU hardware can execute VMs from different VM sets concurrently.

The GPU VM sets-aware GPU scheduler 1412 may then perform a best effort to select VMs from different GPU VM sets for execution concurrently. That is to say, using FIG. 16 as an example, the VM sets-aware GPU scheduler 1412 attempts to select the VM0_x VM1_y, VM2_z and VM3_w to be executed concurrently.

In one embodiment, if available VMs from different GPU VM sets to run concurrently cannot be identified, part of the GPU engines may wait until they are available. For example, if VM2_0, VM2_1, VM2_2 & VM2_3 are all unavailable to run at a given time, the scheduler 1412 may only select the VM0_x, VM1_y, and VM3_w to run at this time. This way, the scheduler can maximize the use of GPU hardware resources.

2. GPU VM Sets-Aware Scheduler with Fewer Rendering Engines

In some embodiments, the number of GPU hardware engines is less than the number of GPU VM sets. By way of example, there may be four GPU VM sets, but only two GPU engines (e.g., engines 1 & 2). In this embodiment, the scheduler may choose two VMs from different VM sets to execute concurrently. For example, if GPU engine 1 is executing the instance of VM2_0, the GPU scheduler 1412 should choose a VM from either GPU VM set 0, 1 or 3, for the GPU engine to execute.

In one embodiment, if available VMs from 2 GPU VM sets cannot be found to run concurrently cannot be identified, the GPU engines may wait until they are available. For example, if VM2/3/4_0, VM2/3/4_1, VM2/3/4_2 & VM2/3/4_3 are all unavailable to run at a given time, the scheduler 1412 may only select the VM1_x (a single VM), to run at this time. This way, the scheduler can maximize the use of GPU hardware resources. Said more generally, if there are N GPU engines and M VM sets, the GPU scheduler 1412 will attempt to schedule the M VM sets such that VMs from different VM sets are executed concurrently on each of the N GPU engines. In one embodiment, this embodiment may be used for cases where the number of VM sets (M) are less than or equal to the number of GPU engines (N). In another embodiment, the number of VM sets is greater than the number of GPU engines, in which case the GPU scheduler 1412 will distribute the VM sets among the GPU engines to ensure that each VM set receives a fair amount of GPU engine processing resources (e.g., using the scheduling techniques described herein).

3. Pre-Load GGTT Entries Under GPU VM Set-Aware Scheduler

In another embodiment, the GGTT entries may be pre-loaded for the next-to-be-scheduled VMs, so that the GGTT entry copy operation can be speculatively completed before the VM is selected to run. This way, the cost (latency) of copying the GGTT entries in hybrid GMADR virtualization can be reduced.

Figure 17B:
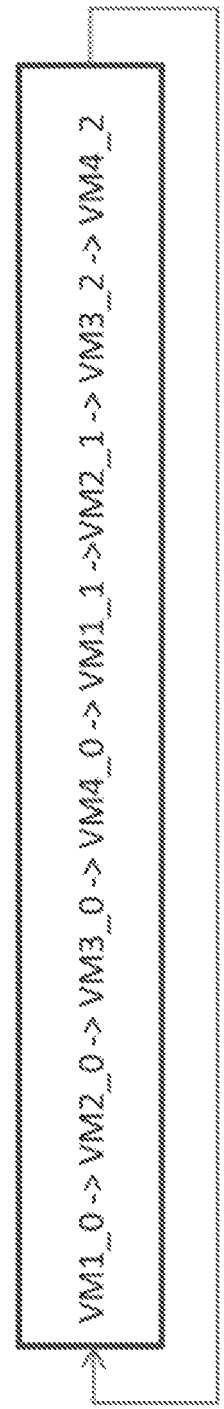

As mentioned above, scheduling the same set of VMs sequentially, as shown in FIG. 17A, may cause frequent GGTT entry copying, which incurs a lot of virtualization overhead and therefore suboptimal performance. In contrast, FIG. 17B illustrates an exemplary round robin scheduler as an example in which scheduling is performed on one VM from each set in sequence, then the next VM from each set, and so on. Note that in FIG. 17B, there may only be one engine to execute the guest instance, but the concept can be applied to situation of multiple engines as well. The copy of the GGTT entries of VM1_1 can be done by CPU, when the GPU engine is executing VM2_0/VM3_0/VM4_0.

4: Co-Existence of GPU VM Sets-Aware GPU Scheduler and CPU Scheduler

As mentioned, the above embodiments are applied to the high GMADR space which is accessed by the GPU only as shown in FIGS. 15-16 (e.g., FIG. 15 shows the aperture within which these techniques are not used). However, in one embodiment of the invention, this policy is applied to apertures as well, which are accessed by the CPU. In this embodiment, the CPU scheduler coordinates with the GPU scheduler to schedule-in the VMs from different GPU VM sets for either CPU or GPU to execute. In one embodiment, for example, CPU(s) are treated for scheduling purposes as one of the GPU engines. In addition, the GPU VM sets-aware scheduler concept may be applied to the CPU scheduler.

The above techniques help mitigate the scalability issues due to the size limitation of the aperture. Note that the term GPU VM means the VM using the GPU resources (shared GGTT) with mediate pass-thru. It does not include the VMs that use emulated graphics device such as a standard VGA card and/or PV framebuffer devices for example.

In this detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A. B, and/or C" means (A), (B). (C), (A and B), (A and C). (B and C), or (A, B. and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including." "having," and the like, as used with respect to embodiments of the present disclosure, are synonymous.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine or a module may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A apparatus comprising:
graphics processing unit (GPU) to process graphics commands and responsively render a plurality of image frames;
a hypervisor to virtualize the GPU to share the GPU among a plurality of virtual machines (VMs); and
VM set management logic to establish a plurality of VM sets, each set comprising a plurality of VMs, the VM set management logic to partition graphics memory address (GMADR) space across each of the VM sets but to share the GMADR space between VMs within each VM set and not share the GMADR space between VMs of different VM sets.

2. The apparatus as in claim 1 further comprising:
a VM set aware GPU scheduler to schedule a first VM from a first VM set for execution on the GPU using the GMADR region assigned to the first VM set.

3. The apparatus as in claim 2 wherein the VM set aware GPU scheduler is to swap out a second VM within the first VM set to execute the first VM, wherein to swap out the second VM, the VM set aware scheduler is to copy global graphics translation table (GGTT) entries associated with the first VM to a physical GGTT.

4. The apparatus as in claim 3 wherein the physical GGTT is to be stored in a system memory.

5. The apparatus as in claim 3 wherein the VM set aware GPU scheduler is to replace GGTT entries of the second VM with GGTT entries of the first VM within the physical GGTT when swapping out the second VM.

6. The apparatus as in claim 2 wherein the GMADR space includes a graphics aperture space shared by a CPU, wherein the VM set aware GPU scheduler and/or a CPU scheduler is to schedule access by the CPU and/or by each of the VMs to access the graphics aperture space.

7. The apparatus as in claim 2 wherein the VM set aware GPU scheduler is to perform round robin scheduling across VM sets, wherein at least one VM from each VM set is scheduled in sequence until a VM has been scheduled from each VM set.

8. The apparatus as in claim 7 wherein a first VM from a first VM set is scheduled, followed by a second VM from a second VM set, followed by a third VM from a third VM, followed by a fourth VM from a fourth VM set, followed by a fifth VM from the first VM set.

9. The apparatus as in claim 7 wherein for N GPU engines, N VMs are scheduled to execute concurrently on the N GPU engines.

10. The apparatus as in claim 9 wherein each of the N VMs are from different VM sets.

11. The apparatus as in claim 1 wherein the GMADR space does not include a graphics aperture space to be shared by a central processing unit (CPU).

12. A method comprising:
processing graphics commands and rendering a plurality of image frames on a graphics processing unit (GPU);
virtualizing the GPU with a hypervisor to share the GPU among a plurality of virtual machines (VMs); and
establishing a plurality of VM sets, each set comprising a plurality of VMs;
partitioning graphics memory address (GMADR) space across each of the VM sets but to share the GMADR space between VMs within each VM set and not share the GMADR space between VMs of different VM sets.

13. The method as in claim 12 further comprising:
scheduling a first VM from a first VM set for execution on the GPU using the GMADR region assigned to the first VM set.

14. The method as in claim 13 further comprising:
swapping out a second VM within the first VM set to execute the first VM, wherein to swap out the second VM; and
responsively copying global graphics translation table (GGTT) entries associated with the first VM to a physical GGTT.

15. The method as in claim 14 wherein the physical GGTT is to be stored in a system memory.

16. The method as in claim 14 further comprising:
replacing GGTT entries of the second VM with GGTT entries of the first VM within the physical GGTT when swapping out the second VM.

17. The method as in claim 13 wherein the GMADR space includes a graphics aperture space shared by a CPU, wherein scheduling is performed by a VM set aware GPU scheduler and/or a CPU scheduler to schedule access by the CPU and/or by each of the VMs to access the graphics aperture space.

18. The method as in claim 13 wherein scheduling comprises performing round robin scheduling across VM sets, wherein at least one VM from each VM set is scheduled in sequence until a VM has been scheduled from each VM set.

19. The method as in claim 18 wherein a first VM from a first VM set is scheduled, followed by a second VM from a second VM set, followed by a third VM from a third VM, followed by a fourth VM from a fourth VM set, followed by a fifth VM from the first VM set.

20. The method as in claim 18 wherein for N GPU engines, N VMs are scheduled to execute concurrently on the N GPU engines.

21. The method as in claim 20 wherein each of the N VMs are from different VM sets.

22. The method as in claim 12 wherein the GMADR space does not include a graphics aperture space to be shared by a central processing unit (CPU).

23. A system comprising:
a memory to store data and program code;
a central processing unit (CPU) comprising an instruction cache for caching a portion of the program code and a data cache for caching a portion of the data, the CPU further comprising execution logic to execute the program code and responsively process the data, at least a portion of the program code comprising graphics commands;
a graphics processing unit (GPU) to process the graphics commands and responsively render a plurality of image frames;
a hypervisor to virtualize the GPU to share the GPU among a plurality of virtual machines (VMs); and
VM set management logic to establish a plurality of VM sets, each set comprising a plurality of VMs, the VM set management logic to partition graphics memory address (GMADR) space across each of the VM sets but to share the GMADR space between VMs within each VM set and not share the GMADR space between VMs of different VM sets.

24. The system as in claim 23 further comprising:
a VM set aware GPU scheduler to schedule a first VM from a first VM set for execution on the GPU using the GMADR region assigned to the first VM set.

25. The system as in claim 24 wherein the VM set aware GPU scheduler is to swap out a second VM within the first VM set to execute the first VM, wherein to swap out the second VM, the VM set aware scheduler is to copy global graphics translation table (GGTT) entries associated with the first VM to a physical GGTT.

26. The system as in claim 25 wherein the physical GGTT is to be stored in a system memory.

27. The system as in claim 25 wherein the VM set aware GPU scheduler is to replace GGTT entries of the second VM with GGTT entries of the first VM within the physical GGTT when swapping out the second VM.

28. The system as in claim 24 wherein the GMADR space includes a graphics aperture space shared by a CPU, wherein the VM set aware GPU scheduler and/or a CPU scheduler is to schedule access by the CPU and/or by each of the VMs to access the graphics aperture space.

29. The system as in claim 24 wherein the VM set aware GPU scheduler is to perform round robin scheduling across VM sets, wherein at least one VM from each VM set is scheduled in sequence until a VM has been scheduled from each VM set.

30. The system as in claim 23 wherein the GMADR space does not include a graphics aperture space to be shared by a central processing unit (CPU).

* * * * *